United States Patent
Giuntoli et al.

(10) Patent No.: US 11,907,865 B2
(45) Date of Patent: Feb. 20, 2024

(54) DETERMINATION OF SECURITY-CONSTRAINED OPTIMAL POWER FLOW

(71) Applicant: Hitachi Energy Ltd, Zurich (CH)

(72) Inventors: Marco Giuntoli, Gross-Gerau (DE); Veronica Biagini, Ladenburg (DE)

(73) Assignee: HITACHI ENERGY LTD, Zürich (CH)

( * ) Notice: Subject to any disclaimer, the term of this patent is extended or adjusted under 35 U.S.C. 154(b) by 470 days.

(21) Appl. No.: 16/821,060

(22) Filed: Mar. 17, 2020

(65) Prior Publication Data

US 2020/0302325 A1 Sep. 24, 2020

(30) Foreign Application Priority Data

Mar. 18, 2019 (EP) ..................... 19163429

(51) Int. Cl.
| | |
|---|---|
| *G06N 7/01* | (2023.01) |
| *G06N 20/00* | (2019.01) |
| *G06Q 10/04* | (2023.01) |
| *G06Q 50/06* | (2012.01) |
| *G06F 119/06* | (2020.01) |

(52) U.S. Cl.
CPC .............. *G06N 7/01* (2023.01); *G06N 20/00* (2019.01); *G06Q 10/04* (2013.01); *G06Q 50/06* (2013.01); *G06F 2119/06* (2020.01)

(58) Field of Classification Search
CPC .......... G06N 7/005; G06N 20/00; G06N 7/01; G06Q 10/04; G06Q 50/06; G06F 2119/06; G06F 2111/06; G06F 30/20; Y02E 40/70; Y02E 60/00; Y04S 40/20; Y04S 10/50; H02J 3/003; H02J 2203/20; H02J 3/381; H02J 3/06; H02J 2203/10
See application file for complete search history.

(56) References Cited

U.S. PATENT DOCUMENTS

| | | | |
|---|---|---|---|
| 2008/0077368 A1* | 3/2008 | Nasle ..................... | G05B 17/02 703/4 |
| 2012/0078436 A1 | 3/2012 | Patel | |
| 2019/0286993 A1* | 9/2019 | Pan ................... | H02J 13/00017 |

OTHER PUBLICATIONS

Maskar, Mukund B., "A Review on Optimal power flow problem and solution methodologies"; 2017 International Conference on Data Management, Analytics and Innovation (ICDMAI); Zeal Education Society; Pune, India; Feb. 24-26, 2017; 8 pages.

(Continued)

*Primary Examiner* — Tejal Gami
(74) *Attorney, Agent, or Firm* — Slater Matsil, LLP

(57) ABSTRACT

A method can be used to determine a security-constrained optimal power flow (SC-OPF) of a power grid. Input data associated with a power grid scenario is obtained. The input data defines a security-constrained optimization problem (SC-OPF problem). The power grid scenario includes a power grid structure, a power demand and a generator capability and/or cost. Power flows in branches of the power grid that are equal to or greater than limits for a contingency associated with the power grid scenario are estimated based on the obtained input data by an AI. A modified optimization problem which is smaller than the SC-OPF problem is solved based on the estimated power flows.

21 Claims, 3 Drawing Sheets

(56) References Cited

OTHER PUBLICATIONS

Sharma, Bhavna, et al., "Security Constrained Optimal Power Flow Employing Particle Swarm Optimization"; 2012 IEEE Sudents' Conference on Electrical, Electronics and Computer Science; Bhopal, India; Mar. 1-2, 2012; 4 pages.

Wu, Lili, et al., "On Artificial Intelligence Approaches for Contingency Analysis in Power System Security Assessment"; 2018 IEEE Power & Energy Society General Meeting (PESGM); Portland, OR, USA; Feb. 5-10, 2018; 5 pages.

Xavier, Alinson S., et al., "Learning to Solve Large-Scale Security-Constrained Unit Commitment Problems"; arXiv:1902.01697; Feb. 4, 2019; 23 pages.

\* cited by examiner

DETERMINATION OF SECURITY-CONSTRAINED OPTIMAL POWER FLOW

CROSS-REFERENCE TO RELATED APPLICATIONS

This application claims the benefit of European Patent Application No. 19163429.4, filed on Mar. 18, 2019, which application is hereby incorporated herein by reference.

TECHNICAL FIELD

The invention relates to the field of power engineering.

BACKGROUND

An electric power system infrastructure comprises, for example, power lines, transformers, electric generators and other components or devices for power generation, power transmission and power distribution, and distributed loads to be supplied with power.

When operating a power system, the problem of determining an optimal operation state and an optimal power grid extension is an aspect to be considered, wherein the problem is generally known as Optimal Power Flow (OPF). Mathematically speaking, OPF is a non-linear and/or non-convex optimization problem having many variables. Due to its high complexity, power system operators still have to use simplified physical models for describing electrical grids. Decisions taken by transmission network operators for short-time operation are nowadays either supported by deterministic analytical approaches (i.e., security constrained dispatch) or even based on experience.

Power system infrastructures are experiencing a transformation driven by, e.g., an increased political and social attention on the energy landscape. For example, there are trends towards high penetration of fluctuating renewable energy sources, posing technical and economic challenges for transmission and distribution network operators as well as utilities. Because of this trend, it seems to be possible that classical analytical approaches for short time operation will no longer be able to deal with the increasing complexity of the power system, considering the increased number of active components, unpredictable generation, e.g. if renewable energies are used, and forecasting errors.

Due to the increasing complexity of the power system infrastructure, also the problem of determining an optimal operation state and an optimal power grid extension has an increasing complexity, which requires an increasing computational effort. In this context, the larger the power grid is, e.g., in terms of the number of components involved, and/or the higher a number of corresponding scenarios is, the higher is the computational effort.

To overcome this problem, researchers have investigated solutions, for example, on decomposition approaches etc. However, there is still a need to provide advanced control algorithms, optimization solutions etc. for enabling a safe, reliable and efficient power system and/or power grid operation.

SUMMARY

The disclosure relates to the field of power engineering. In particular embodiments, the disclosure relates to a method of determining a security-constrained optimal power flow (SC-OPF) of a power grid, a method of operating a power grid assisted by an artificial intelligence module (AI-module), a corresponding apparatus and a power grid.

Embodiments of the invention provide a possibility for supporting determination of an optimal power flow in power system infrastructures, for example, in complex power system infrastructures.

According to a first aspect, a method of determining a security-constrained optimal power flow (SC-OPF) of an electric power system, e.g., a power grid. The method can be computer-implemented and comprises the following steps: obtaining input data, e.g. operational input data, associated with a power grid scenario defining a security-constrained optimization problem (SC-OPF problem) the power grid scenario at least comprising a power grid structure and/or topology, a power demand, e.g. of one or more loads, and a generator capability, e.g. power limits, startup time etc., and costs and/or a price of preferably one or more electric generators; estimating, which may also be referred to as determining, based on the obtained input data, of power flows in branches of the power grid which are equal to or greater than limits for at least one contingency, preferably a plurality of contingencies and/or for each contingency, associated with the power grid scenario by means of an artificial intelligence module, AI-module; and solving, based on the estimated power flows, a modified optimization problem which is smaller than the SC-OPF problem.

It is noted that the solving of the smaller-sized, modified optimization problem may simply be a mere acknowledgment if the estimation and/or determination, which may also be referred to as an intermediate solution, provided by AI-module is already sufficiently accurate such that it may regarded as the final or desired solution. Alternatively, the solving of the smaller-sized, modified optimization problem may comprise computational operations performed by, e.g., an control apparatus Thus, the method generally reduces the computational effort for determining an SC-OPF of a power grid. In particular, the method replaces the original SC-OPF problem arising from the obtained power grid scenario by a simpler and computationally less expensive optimization problem, which particularly may be reduced in terms of its complexity. By use of the AI-module, which may be trained for that purpose before, the method shifts the computational effort from a real-time operation, which may include a determination of the SC-OPF, controlling the power grid etc. during ongoing operation, to a training phase of the AI-module. Thus, in particular due to the smaller size of the problem to be solved, it is either possible to analyze the same power grid scenario in reduced time or to analyze more different power grid scenarios in the same time. The method may enable a semi-autonomous or a fully autonomous power system, power grid and/or network control.

In this context, the input data may be obtained from a central and/or decentralized monitoring device, measuring device, a computer model etc.

Further, the term "small" regarding the modified optimization problem to be solved may be understood that it has a reduced complexity so that solving this problem requires less computational efforts compared to the original, bigger SC-OPF problem.

Further, an optimal power flow (OPF) problem may particularly describe a minimum cost electricity generation model that takes into account, for example, generation level constraints, line flow constraints, bus voltage constraints, or the like. However, the normal OPF model is not necessarily secure against failures of components or devices of the power system. To take this into account, the SC-OPF, may guarantee, in contrast to the simpler OPF, that the power system, in particular the power grid, may provide power flow not only under normal conditions, under which, for example, all the components or devices work in accordance with specifications, but also for any contingency state caused by a failure, loss etc. of one or more components of the power system, particularly of the power grid, such as power transmission lines, generators etc.

Further, an artificial intelligence module, AI-module, may be an entity that processes one or more inputs, such as electronic data, signals or the like, into one or more outputs by means of an internal processing chain that typically has a set of free parameters. The internal processing chain may be organized in interconnected layers that are traversed consecutively when proceeding from the input to the output. The AI-module may preferably be organized to process an input having a high dimensionality into an output of a much lower dimensionality. Such a module is termed "intelligent" because it is capable of being "trained." The module may be trained using records of training data, also referred to as a training data set. A record of training data comprises training input data and corresponding training output data. The training output data of a record of training data is the result that is expected to be produced by the module when being given the training input data of the same record of training data as input. The deviation between this expected result and the actual result produced by the module is observed and rated by means of a "loss function". This loss function is used as a feedback for adjusting the parameters of the internal processing chain of the module. For example, the parameters may be adjusted with the optimization goal of minimizing the values of the loss function that result when all training input data is fed into the module and the outcome is compared with the corresponding training output data. The result of this training is that given a relatively small number of records of training data as "ground truth", the module is enabled to perform its job, e.g., the classification of images as to which objects they contain, well for a number of records of input data that higher by many orders of magnitude.

In an embodiment, the step of solving the smaller-sized optimization problem is performed iteratively until a termination criterion is reached.

Thus, an optimal solution for the SC-OPF problem may be obtained.

According to an embodiment, the step of solving the smaller-sized optimization problem is performed iteratively until no violation is identified or violations are eliminated.

Thus, an optimal solution for the SC-OPF problem having a high degree of accuracy may be obtained.

In an embodiment, the solving of the smaller-sized optimization problem comprises adding possible new flow violations iteratively.

Thus, determining the optimal solution of the SC-OPF problem may be derived with a particularly high efficiency and/or accuracy.

According to an embodiment, a solution obtained by the solving of the smaller-sized optimization problem is checked whether violations occur.

Thus, the solution of the problem can be checked and possibly further improved.

In an embodiment, a solution obtained by solving the smaller sized optimization problem is provided as SC-OPF problem solution output data.

Thus, these data may be provided to a further entity for automatic data processing. For example, the SC-OPF problem solution output data may be provided to a control apparatus which may be used by an operator of the power system, power grid, network etc.

According to an embodiment, the power grid scenario, in particular operational, input data may comprise at least one or more information selected from:
 a number of nodes arranged within the power grid;
 a number of lines arranged within the power grid, an impedance of one or more lines and/or a flow limit of one or more lines;
 a number of electrical generators integrated in the power grid, a power limit of one or more electrical generators and/or a cost value of one or more electrical generators;
 a number of loads integrated in the power grid, a power consumption value of one or more loads and/or a position within the power grid of one or more loads.

This information may be provided by an operator of the power system, power grid, network etc., measuring devices, model data, or the like.

Thus, based on this information, the SC-OPF may be provided with a particularly high accuracy.

In an embodiment, the linearized SC-OPF problem to be solved may satisfy an N−1 criterion, the security-constrained optimization problem to be expressible by $(NL^2+1) \cdot NN$, wherein NL is a number of branches of the power grid and NN is a number of nodes of the power grid. Preferably, modified, smaller-sized optimization problem provided after processing by the AI-module is, for example, a magnitude smaller than the SC-OPF problem. For example, the modified, smaller-sized optimization problem may be expressible by $(NL+1) \cdot NN$, and/or may be defined as a general OPF problem.

Accordingly, if the N−1 criterion has to be satisfied, which criterion describes the SC-OPF and the problem associated therewith, for all the branches of the power grid, the dimension of the optimization problem to be solved becomes $(NL^2+1) \cdot NN$. This means that the SC-OPF problem dimension is about NL-times larger than a simpler or less complex OPF problem. This also means that the above described problem is computationally very expensive when considering very large networks and huge number of scenarios to analyze.

According to an embodiment, the solving of the modified, smaller-sized optimization problem may be performed during real-time operation of the power grid.

In particular, the SC-OPF problem may be replaced by a simpler and computationally less expensive optimization problem, e.g. an OPF problem, whose boundary-constraints are given by the suitably trained AI-module. Due to the smaller-sized problem it is either possible to analyze the same scenario in reduced time, and thus it may be performed during real-time operation of the power system, power grid, network etc.

In a second aspect, a method of operating a power grid is provided. In particular, provided is a method of operating a power grid assisted by an artificial intelligence module, AI-module. During a first phase, a training data set is generated, the first training data set comprising a plurality of solutions of at least one security-constrained optimal power flow problem, SC-OPF problem, associated with at least one power grid scenario. During a second phase, which preferably is subsequent to the first phase, the AI-module is trained by supplying the training data set to the AI-module. During a third phase, which preferably is subsequent to the second phase, the power grid is operated in a certain, e.g. currently given, power grid scenario, the operation at least partly depending on SC-OPF problem solution output data obtained by solving a modified optimization problem, the size of which has been reduced by the thus original trained AI-module in response to input data associated with the power grid scenario.

Thus, this method shifts the computational effort from the operational third phase to the AI-module learning phase, namely the first phase and/or second phase. As a result, an at least partially automated control of the network can be implemented, since the reduced computational effort may be performed in real-time.

According to an embodiment, during the third phase, the AI-module may be retrained by using SC-OPF solution data, preferably obtained by another entity which is different to the AI-module.

In particular, the AI-module may be adapted for online training. Thus, the AI-module may, after the initial offline training as described above with respect to the first phase and/or second phase, be used for the real time operation. In this working condition, the AI-module may be updated on a regular basis. This allows the AI-module to adapt to actual power grid scenarios and/or events and to possible topological changes of the power grid.

A third aspect provides an apparatus for determining a security constrained optimal power flow, SC-OPF, of a power grid. The apparatus is adapted to perform a method according to the first aspect or to the second aspect, or both the first and second aspect.

The apparatus, which may be provided as a computer having at least one processor, a memory, a communication interface, or the like, may be adapted or configured to receive input data, e.g. in form of electronically processable signals, comprising a number of operational parameters of the power grid, and in particular to receive the input data associated with a power grid scenario defining a security-constrained optimization problem, SC-OPF problem, the power grid scenario at least comprising a power grid structure, a power demand and a generator's capability and price. Further, the apparatus may be adapted to generated output data, e.g. in form of electronically processable signals, that are adapted to control and/or operate the power system, power grid, network etc.

In a fourth aspect, a method of training an artificial intelligence module, AI-module, is provided. The AI-module, which may be the AI-module according to the first and second aspect, is to be trained so as to be adapted for determining a security constrained optimal power flow, SC-OPF, of a power grid, the method comprising the steps of:

providing input data associated with a power grid scenario defining a security-constrained optimization problem, generating a training data set, and providing the training data set to the AI-module. The training data set comprising a plurality of solutions of at least one security-constrained optimal power flow problem (SC-OPF problem) associated with at least one given power grid scenario.

Accordingly, the AI-module obtains as an input the power grid scenario information and corresponding solution data, i.e. solution data that was generated in advance for the given or at least a similar power grid scenario.

Thus, an AI-module can be provided that allows to shift the computational efforts for solving an SC-OPF problem from the execution of the optimization problem to the training phase of the AI-module, thereby enabling an at least semi-automatic operation of the power grid in terms of determining an SC-OPF.

In an embodiment, the least one security-constrained optimal power flow problem is solved a number of times and a database of these optimal solutions is created.

Before or during the training phase of the AI-module, the database may be created by solving the computational expensive SC-OPF problems a number of times. The database may then contain the corresponding power grid scenario associated with the SC-OPF problem and/or contingencies, and assign this information to the corresponding solution. At least this assigned combination of data may be provided to the AI-module during its training phase.

A fifth aspect provides a power grid, which may also be referred to a power system or network. The power grid comprises a plurality of distributed electrical generators, a plurality of distributed loads, a plurality of branches, adapted to electrically connect the electrical generators and/or the loads to each other, and a control apparatus, adapted to control operation of at least a part of the power grid and to determine a security constrained optimal power flow, SC-OPF, of the power grid, the control apparatus comprising an artificial intelligence module, AI-module. the AI-module is adapted to automatically generate SC-OPF problem solution output data associated with the SC-OPF, the AI-module adapted to, in response to received input data associated with a power grid scenario, reduce the SC-OPF problem to a modified optimization problem which is smaller than the SC-OPF problem. The control apparatus is adapted to solve the modified, smaller-sized optimization problem and the control apparatus is adapted to operate the power grid depending on at least the SC-OPF problem solution output data.

Thus, the AI-module enables a short-time determination of the SC-OPF such that the power grid may be operated at least semi-automatically. In particular, the AI-module shifts the computational efforts for determining the SC-OPF, which particularly results from solving a power grid scenario-related big-sized or complex optimization problem, to the training phase of the AI-module, so that during operation of the power grid a modified, smaller-sized optimization problem remains that may be solved in real-time operation.

According to a sixth aspect, a computer program element is provided, which, when being executed by at least one processing unit, is adapted to cause the processing unit to perform the method according to the first, second and/or third aspect.

A seventh aspect provides a computer readable medium having stored thereon the computer program element according to the sixth aspect.

These and other aspects of the present invention will become apparent from and elucidated with reference to the embodiments described hereinafter.

BRIEF DESCRIPTION OF THE DRAWINGS

The subject-matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF ILLUSTRATIVE EMBODIMENTS

Figure 1:
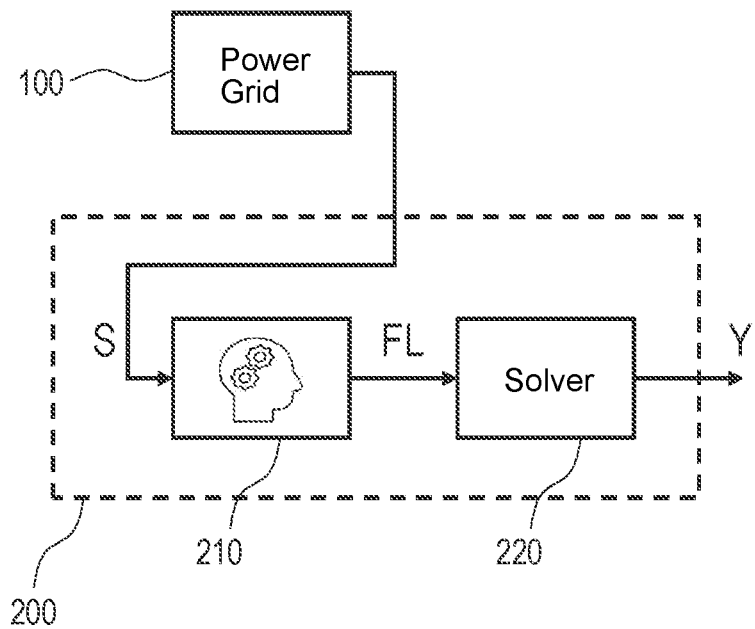
FIG. 1 shows a schematic block diagram of a power grid and an apparatus adapted to at least partially operate the power grid according to an embodiment.

FIG. 1 shows in a schematic block diagram a power grid 100, which may also referred to as a power system. The power grid 100 has a given structure and/or topology in terms of a number of active components involved and requires an ongoing network monitoring and/or control to enable safe, reliable and/or efficient power grid operation.

In particular, the power grid 100 comprises at least a number of nodes, a number of lines, which lines have an impedance, flow limits etc., a number electric generators, which generators have power limits, cost values etc., and/or a number of loads to be supplied with electric power, which loads have e.g. an energy demand that can change over the time, a specific position/location etc. In way of example, the electric generators may at least partially be based on renewable energy, such as wind turbines, solar plants, or the like, and/or on conventional energy supplying methods, such as coal-fired power plants, nuclear power plants, and gas-fired power plants. The different types of generators may have different power limits and/or cost values.

Based on this, a power grid scenario S associated with the power grid 100 is given, wherein the power grid scenario S at least comprises information about the power grid structure, a power demand, e.g., a power demand profile, of certain parts or the whole power grid 100, the capability of producing power within the power grid 100, and/or a generator's capability, its costs or its price. Beyond this, the Scenario S may comprise less or more data that is conceivable with respect to the power grid 100.

The power grid 100 is connected to an apparatus 200 which is adapted to operate, monitor and/or control the power grid 100. The apparatus 200 may be a computer system or may be at least computer-implemented. In some embodiments, the apparatus 200 has a processor, a memory for storing computer program elements to be processed by the processor, data interfaces to at least a part of the power grid 100, to other monitoring, control device, the generators, switchers, or the like.

As shown in FIG. 1, the apparatus 200 comprises an artificial-intelligence module 210, AI-module 210, and a solver module 220, which may be optionally provided and arranged downstream to the AI-module 210. The solver module 220 may be adapted to provide one or more techniques for solving an optimization problem.

The AI-module 210 has been trained before to be adapted for supporting the control and/or operation of the power grid 100. The AI-module 210 has a data input interface for obtaining, e.g. receiving, input data associated with the power grid scenario S, as indicated by the corresponding reference sign on the input side of the AI-module 210. The provided power grid scenario S defines a security-constrained optimization problem, SC-OPF problem, regarding the respective optimal power flow to be determined. In some embodiments, the SC-OPF problem to be solved has to satisfy an N−1 criterion, so that the security-constrained optimization problem may be at least partly expressed by $(NL^2+1) \cdot NN$, wherein NL is a number of branches of the power grid 100 and NN is a number of nodes of the power grid 100.

The AI-module 210 is further adapted to estimate, which may also referred to as determining, based on the obtained input data in form of the power grid scenario S, a power flow FL in branches of the power grid 100. The estimated or determined power flow FL is equal to or greater than limits for a plurality of contingencies associated with the power grid scenario S. The estimated or determined power flow FL may be provided by the AI-module 210, e.g. via an output interface, as output data as indicated by the corresponding reference sign of the output side of the AI-module 210. The power flow FL provided by the AI-module 210 is, in some embodiments, to be further processed by the apparatus 200, and in particular by the solver module 220. It is noted that, according to some embodiments and/or circumstances, such as specific power grid scenarios S, the estimated or determined power flows FL as provided by the AI-module 210 may already provide an optimal solution of the SC-OPF problem, so that the provided power flows FL which do not need to be further processed. In this case, the power flows FL as provided by the AI-module 210 correspond to a final solution Y that would otherwise be provided by the solver module 210.

However, in some embodiments, the apparatus 200 is further adapted to solve, based on the power flows FL as estimated or determined by the AI-module 210, a modified optimization problem which is smaller than the SC-OPF problem, particularly in terms of its mathematical complexity. In other words, the AI-module 210 is adapted to reduce the SC-OPF problem arising from the given power grid scenario S, such that only a mathematically simpler, smaller-sized and/or computationally less expensive optimization problem remains. This smaller-sized, modified optimization problem is designated by the reference sign FL, as it is at least based on the power flows FL as provided by the AI-module.

Regardless of whether the final solution Y is already determined by the power flows FL as provided by the AI-module or after solving the smaller-sized, modified problem which is at least based on the power flows FL, the apparatus 200 is adapted to provide the solution Y, either directly obtained in form of the power flows provided by the AI-module 210 or by solving the smaller sized optimization problem by the solver module 220, as SC-OPF problem solution output data. Based on this SC-OPF problem solution output data, the operation of the power grid 100 may be controlled in real-time.

Figure 2:
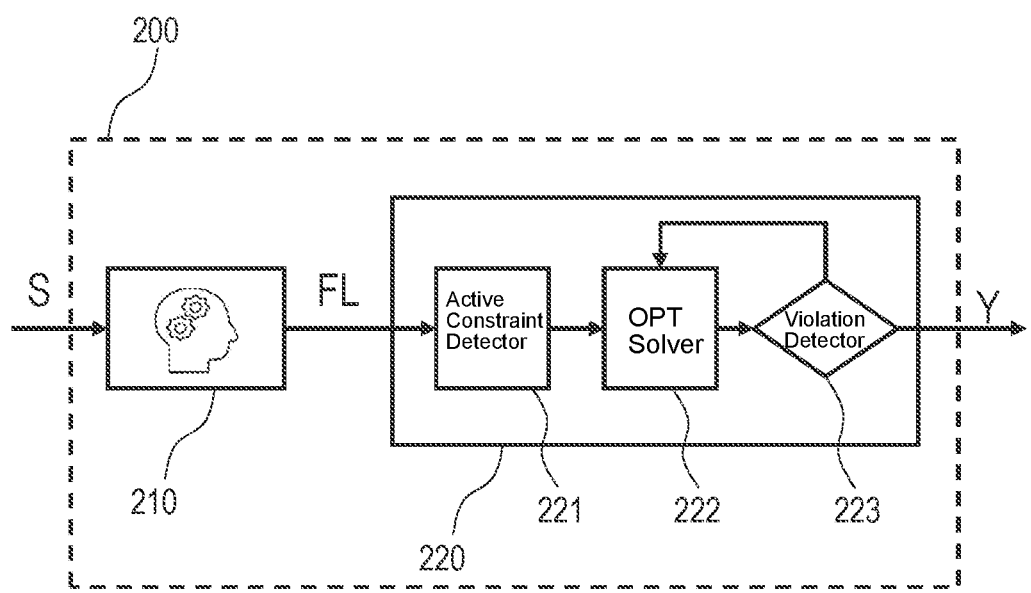
FIG. 2 shows a schematic block diagram of a power grid and an apparatus adapted to at least partially operate the power grid according to a further embodiment.

FIG. 2 shows in a schematic block diagram the solver module 220 according to at least some embodiments in more detail. Accordingly, the solver module 220 comprises an active constraint detector 221, which is arranged downstream to the AI-module 210 and adapted to detect active constraints based on the power flows FL as provided by the AI-module 210, an OPT solver 222, which is arranged downstream to the active constraint detector 221 and adapted to provide one or more techniques for solving the smaller-sized, modified optimization problem based on or derived from the on the power flows FL as provided by the AI-module 210 by linear programming or the like, and a violation detector 223, which is arranged downstream to the OPT solver 222 and adapted to detect violations and/or, in case of violations, to add new constraints to the optimization. As can be seen in FIG. 2, the solving of the smaller-sized, modified optimization problem that is based and/or derived from the power flows FL as provided by the AI-module 210 is performed iteratively until a termination criterion is reached. This termination criterion may, for example, be the absence or eliminations of violations.

Figure 3:
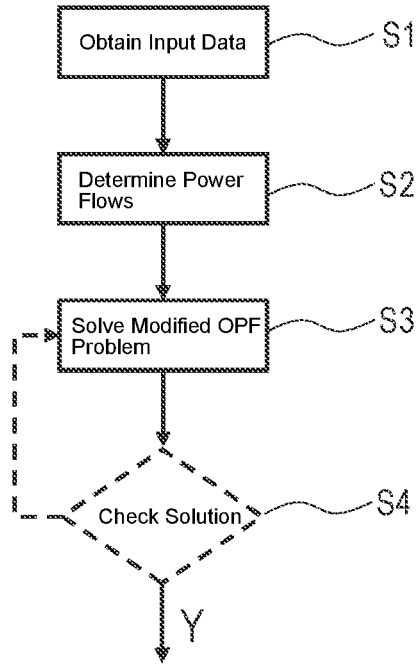
FIG. 3 shows a flow chart of a method of determining a security-constrained optimal power flow, SC-OPF, of a power grid.

FIG. 3 shows a flow chart of a method of determining a security-constrained optimal power flow, SC-OPF, of a power grid. The method is preferably carried out by use of the AI-module 210 and the solver module 220 as explained above.

In a step S1, input data associated with the power grid scenario S is obtained by the apparatus 200, in particular by the AI-module 210. As explained above, the power grid scenario S defines a security-constrained optimization problem, SC-OPF problem, wherein the power grid scenario S at least comprises a power grid structure, a power demand of one or more loads and a generator capability and/or its costs.

In a step S2, the AI-module 210 estimates or determines, based on the obtained input data, i.e. the provided power grid scenario S, the power flows FL in one or more branches of the power grid 100, power flows FL are equal to or greater than limits for a plurality of contingencies associated with the power grid scenario S.

In a step S3, the apparatus 200, and in some embodiments the solver module 220, solves, based on the estimated or determined power flows, the smaller-sized modified optimization problem based on or derived from the estimated or determined power flows.

In a step S4, as indicated in FIG. 3 by dashed lines, in some embodiments, the smaller-sized, modified optimization problem which is smaller than the original SC-OPF is solved iteratively. In particular, in a step S4, the solution derived in step S3 is checked whether violations occur or are present, respectively. Accordingly, the step S3 of the solving is repeatedly performed until no violations are identified, by adding possible new flow violations iteratively.

If no violations occur, the method reaches its termination criterion and the final solution Y is used or serves as a basis for operating the power grid 100.

Figure 4:
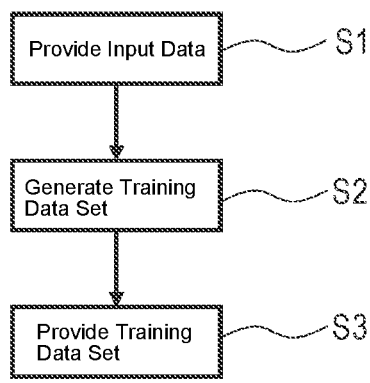
FIG. 4 shows a flow chart of a method of training an artificial intelligence module.

FIG. 4 shows a flow chart of a method of training the AI-module 210, the AI-module 210 to be adapted for determining a security constrained optimal power flow, SC-OPF, of the power grid 100.

In a step S1, input data associated with one or more power grid scenarios S is provided, the power grid scenarios S defining one or more security-constrained optimization problem.

In a step S2, a training data set is generated, the training data set comprising a plurality of solutions of at least one security-constrained optimal power flow problem, SC-OPF problem, associated with at least one given power grid scenario S.

Optionally, a database (not shown) is created after step S1 and/or step 2.

In a step S3, the training data set, comprising the power grid scenario and the corresponding of the optimization problem derived therefrom, to the AI-module 210.

Figure 5:
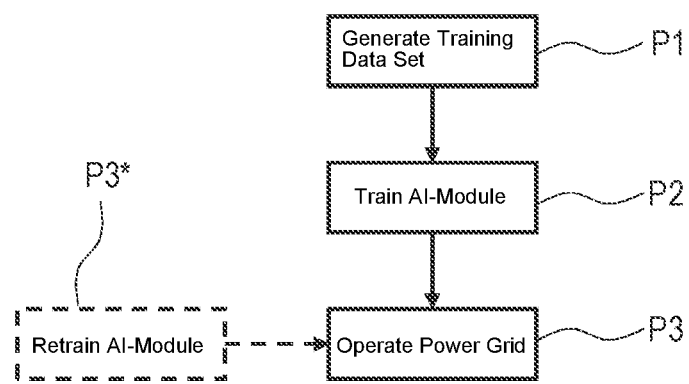
FIG. 5 shows a flow chart of a method of operating the power grid.

FIG. 5 shows a flow chart of a method of operating the power grid 100 assisted by the AI-module 210.

During a first phase P1, the training data set is generated (see e.g. the training method above), the training data set comprising a plurality of solutions of at least one security-constrained optimal power flow problem, SC-OPF problem, associated with at least one power grid scenario S.

During a second phase P2, the AI-module 210 is trained by supplying the training data set to the AI-module 210.

During a third phase P3, the power grid 100 is operated in a power grid scenario S, the operation at least partly depending on SC-OPF problem solution output data Y obtained by solving a modified optimization problem, the size of which has been reduced by the thus trained AI-module 210 in response to input data associated with the power grid scenario S.

Optionally, in a phase P3*, the AI-module 210 is retrained online by using SC-OPF solution data obtained from an entity, e.g. the database used for the initial training as explained above, that is different to the AI-module 210.

Preferably, the functional modules and/or the configuration mechanisms described herein are implemented as programmed software modules or procedures, respectively; however, one skilled in the art will understand that the functional modules and/or the configuration mechanisms can be implemented fully or partially in hardware.

It should to be noted that embodiments of the invention are described with reference to different subject-matters. In particular, some embodiments are described with reference to method-type claims, whereas other embodiments are described with reference to device-type claims. However, a person skilled in the art will gather from the above, and the following description that, unless otherwise notified, in addition to any combination of features belonging to one type of subject-matter, also other combinations between features relating to different subject-matters is considered to be disclosed with this application.

All features can be combined to provide a synergetic effect that is more than the simple summation of the features.

While the invention has been illustrated and described in detail in the drawings and foregoing description, such illustration and description are to be considered illustrative or exemplary, and not restrictive. The invention is not limited to the disclosed embodiments.

Other variations to the disclosed embodiments can be understood, and effected by those skilled in the art in practicing the claimed invention, from a study of the drawings, the disclosure, and the dependent claims.

In the claims, the word "comprising" does not exclude other elements or steps, and the indefinite article "a" or "an" does not exclude a plurality. A single processor, or other unit, may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method of operating a power grid, the method comprising, by at least one processor executing at least one program element:

collecting input data, from a central and/or decentralized monitoring device, measuring device, or computer model, associated with a power grid scenario, the input data defining a security-constrained optimization problem (SC-OPF problem), wherein the power grid scenario comprises a power grid structure, a power demand and a generator capability and/or cost;

estimating, based on the obtained input data, power flows in branches of the power grid that are equal to or greater than limits for a contingency associated with the power grid scenario, the estimating performed by an artificial intelligence (AI) module;

reducing, by the AI module, the SC-OPF problem to a modified optimization problem, the modified optimization problem being smaller than the SC-OPF problem;

determining, based on the estimated power flows, a solution to the modified optimization problem by a solver module; and operating the power grid based on the solution of the modified optimization problem.

2. The method according to claim 1, wherein determining the solution to the modified optimization problem is performed iteratively until a termination criterion is reached.

3. The method according to claim 1, wherein determining the solution to the modified optimization problem is performed iteratively until no violation is identified or violations are eliminated.

4. The method according to claim 1, wherein determining the solution to the modified optimization problem comprises adding possible new flow violations iteratively.

5. The method according to claim 1, further comprising checking the solution of the modified optimization problem to determine whether violations occur.

6. The method according to claim 1, wherein solution to the modified optimization problem is provided as SC-OPF problem solution output data.

7. The method according to claim 1, wherein the power grid scenario input data comprises at least one or more information selected from:
- a number of nodes arranged within the power grid;
- a number of lines arranged within the power grid;
- an impedance of one or more lines and/or a flow limit of one or more lines;
- a number of electrical generators integrated in the power grid;
- a power limit of one or more electrical generators and/or a cost value of one or more electrical generators;
- a number of loads integrated in the power grid; and
- a power consumption value of one or more loads and/or a position within the power grid of one or more loads.

8. The method according to claim 1, wherein the SC-OPF problem to be solved is to satisfy an N−1 criterion, the security-constrained optimization problem to be expressible by $(NL^2+1) \cdot NN$, wherein NL is a number of branches of the power grid and NN is a number of nodes of the power grid.

9. The method according to claim 1, wherein solving the modified optimization problem is performed during real-time operation of the power grid.

10. A method of operating a power grid assisted by an artificial intelligence (AI) module, the method comprising, by at least one processor executing at least one program element:
during a first phase, generating a training data set that comprises a plurality of solutions of at least one security-constrained optimal power flow (SC-OPF) problem associated with at least one power grid scenario, the training data set comprising training input data and corresponding training output data, the training output data being the expected output when the corresponding input data is input;
during a second phase, training the AI-module by supplying the training data set to the AI-module; and
during a third phase, operating the power grid in a power grid scenario, the operation at least partly depending on SC-OPF problem solution output data obtained by solving a modified optimization problem that has a size that has been reduced by the trained AI-module in response to input data associated with the power grid scenario.

11. The method according to claim 10, wherein, during the third phase, the AI-module is retrained using SC-OPF solution data, the retraining comprising:

receiving output data from the AI-module resulting from the input of the training data set;
comparing the output data and the training output data corresponding to the training input data of the training data set; and
adjusting parameters of the AI-module based on the comparison.

12. The method according to claim 10, wherein the modified optimization problem is solved during real-time operation of the power grid.

13. A method of training an artificial intelligence (AI) module to determine a security-constrained optimal power flow (SC-OPF) of a power grid, the method comprising, by at least one processor executing at least one program element:
providing input data associated with a power grid scenario, the input data defining a security-constrained optimization problem;
generating a training data set, the training data set comprising a plurality of solutions of a SC-OPF problem associated with at least one given power grid scenario, the training data set comprising training input data and corresponding training output data, the training output data being the expected output when the corresponding input data is input; and
providing the training data set to the AI-module;
receiving output data from the AI-module resulting from the input of the training data set;
comparing the output data and the training output data corresponding to the training input data of the training data set; and
adjusting parameters of the AI-module based on the comparison.

14. The method according to claim 13, wherein the SC-OPF problem is solved a number of times and a database of these optimal solutions is created.

15. The method according to claim 13, further comprising retraining the AI-module based on additional information obtained after the power grid is operated.

16. A power grid, comprising:
a plurality of distributed electrical generators;
a plurality of distributed loads;
a plurality of branches, adapted to electrically connect the electrical generators and/or the loads to each other; and
a control apparatus, adapted to control operation of at least a part of the power grid and to determine a security-constrained optimal power flow (SC-OPF) of the power grid, the control apparatus comprising an artificial intelligence (AI) module and a solver module;
wherein the AI-module is adapted to automatically generate SC-OPF problem solution output data associated with the SC-OPF,
wherein the AI-module is further adapted to, in response to received input data, from a central and/or decentralized monitoring device, measuring device, or computer model, associated with a power grid scenario, reduce the SC-OPF problem to a modified optimization problem which is smaller than the SC-OPF problem;
wherein the solver module is adapted to solve, the modified optimization problem; and
wherein the control apparatus is further adapted to operate the power grid based on at least the SC-OPF problem solution output data.

17. The power grid according to claim 16, wherein the AI-module further adapted to be retrained after the power grid is operated based on at least the SC-OPF problem solution output data.

18. The power grid according to claim 16, further comprising a database accessible by the control apparatus and adapted to a plurality of SC-OPF solutions.

19. The power grid according to claim 16, wherein the control apparatus is adapted to solve the modified optimization problem iteratively until a termination criterion is reached.

20. The power grid according to claim 16, wherein the control apparatus is adapted to solve the modified optimization problem iteratively until no violation is identified or violations are eliminated.

21. The power grid according to claim 16, wherein the control apparatus is adapted to solve the modified optimization problem by adding possible new flow violations iteratively.

* * * * *